(12) United States Patent
Jung

(10) Patent No.: US 9,367,514 B2
(45) Date of Patent: Jun. 14, 2016

(54) COMMUNICATION NODE AND COMMUNICATION METHOD

(75) Inventor: Heeyoung Jung, Daejeon (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 527 days.

(21) Appl. No.: 13/807,842

(22) PCT Filed: Jun. 29, 2011

(86) PCT No.: PCT/KR2011/004748
§ 371 (c)(1),
(2), (4) Date: Dec. 31, 2012

(87) PCT Pub. No.: WO2012/002726
PCT Pub. Date: Jan. 5, 2012

(65) Prior Publication Data
US 2013/0103852 A1   Apr. 25, 2013

(30) Foreign Application Priority Data

Jun. 30, 2010   (KR) .................. 10-2010-0062792
May 23, 2011   (KR) .................. 10-2011-0048675

(51) Int. Cl.
*G06F 15/16*   (2006.01)
*G06F 15/173*   (2006.01)
*H04L 12/00*   (2006.01)
(Continued)

(52) U.S. Cl.
CPC .......... *G06F 15/17312* (2013.01); *H04L 12/00* (2013.01); *H04L 12/4633* (2013.01); *H04L 29/00* (2013.01); *H04L 69/161* (2013.01); *H04L 69/163* (2013.01)

(58) Field of Classification Search
CPC . H04L 12/4633; H04L 69/161; H04L 69/163; H04L 29/00
USPC .................................................. 709/236, 230
See application file for complete search history.

(56) References Cited

U.S. PATENT DOCUMENTS 6,591,302 B2 *  7/2003  Boucher ................. H04L 29/06
                                                                 709/230
6,910,033 B2     6/2005  Rosenblum
(Continued)

FOREIGN PATENT DOCUMENTS

KR   1020010112222 A   12/2001
KR   1020050017108 A   2/2005
WO   WO00-33494 A1   6/2000

OTHER PUBLICATIONS

J.H. Saltzer et al., End to End Argument in System Design, ACM Trans. on Computer Systems, Nov. 1984, p. 277-288, vol. 2, No. 4.
(Continued)

*Primary Examiner* — Hieu Hoang
(74) *Attorney, Agent, or Firm* — Rabin & Berdo, P.C.

(57) ABSTRACT

In a network environment where end hosts communicate with each other through end nodes connected to a backbone network, when data is sent, each end host generates a packet including a header including host identifier information corresponding to a reception path and a destination path, and transfers the corresponding packet to the end node through an access network. The end node adds a new transport control protocol (TCP) header to the received packet and transfers it to the backbone network, thus controlling traffic, errors and the like in the backbone network.

7 Claims, 8 Drawing Sheets

(51) Int. Cl.
*H04L 29/00* (2006.01)
*H04L 29/06* (2006.01)
*H04L 12/46* (2006.01)

(56) References Cited

U.S. PATENT DOCUMENTS

| | | | |
|---|---|---|---|
| 7,069,495 B2* | 6/2006 | Soderberg | H04L 29/06 370/389 |
| 8,316,226 B1* | 11/2012 | Kshirsagar | H04L 63/0272 713/150 |
| 2002/0016851 A1* | 2/2002 | Border | 709/234 |
| 2002/0058480 A1* | 5/2002 | Ikeda | 455/67.1 |
| 2002/0089930 A1 | 7/2002 | Garcia-Luna-Aceves et al. | |
| 2003/0105877 A1* | 6/2003 | Yagiu | H04L 1/16 709/237 |
| 2004/0088262 A1* | 5/2004 | Boucher | G06Q 20/367 705/65 |
| 2004/0158765 A1* | 8/2004 | Charzinski | 714/4 |
| 2005/0097242 A1* | 5/2005 | Sarkar | H04L 69/16 710/36 |
| 2005/0232147 A1 | 10/2005 | Bang et al. | |
| 2006/0002298 A1* | 1/2006 | Suzuki | H04L 49/355 370/235 |
| 2006/0045011 A1* | 3/2006 | Aghvami et al. | 370/230 |
| 2006/0262783 A1* | 11/2006 | Nedeltchev | 370/389 |
| 2007/0076625 A1* | 4/2007 | Tahara | H04L 29/12028 370/252 |
| 2008/0040519 A1* | 2/2008 | Starr | H04L 49/90 710/39 |
| 2009/0059928 A1* | 3/2009 | Enomoto et al. | 370/394 |
| 2009/0129394 A1* | 5/2009 | Bar-Kovetz | H04L 45/00 370/395.32 |
| 2012/0092995 A1* | 4/2012 | Arvidsson | H04L 47/10 370/235 |

OTHER PUBLICATIONS

D. Farinacci et al., Locator/ID Separation Protocol (LISP), IETF, Apr. 25, 2010, draft-ietf-lisp-07.

H. Inamura et al., TCP over Second (2.5G) and Third (3G) Generation Wireless Network, IETF, Feb. 2003, RFC3481.

* cited by examiner

COMMUNICATION NODE AND COMMUNICATION METHOD

BACKGROUND OF THE INVENTION (a) Field of the Invention

The present invention relates to a communication method. More particularly, the present invention relates to a communication node transmitting data via a network, and a communication method therefor.

(b) Description of the Related Art

Currently, functions for inter-networking are implemented in the Internet in a distributed fashion between a Transport Control Protocol (TCP) layer and an Internet Protocol (IP) layer. The IP layer is concerned with addressing and hop-by-hop routing for inter-networking, and the TCP layer is concerned with connection setup & tear down, flow control, error control, and congestion control for end-to-end communication.

Most main functions for communication between end hosts on the Internet are implemented in the end hosts. As for layers implemented at each end host, an IP layer for addressing and routing support for packet transfer is present on a Physical/Media Access Control (PHY/MAC) layer unique to each Access Network (AN), and a TCP layer for end-to-end error and traffic control (Instead of the TCP layer, a User Data Protocol (UDP) or Session Control Protocol (SCTP) layer may be placed) is on the IP layer, and an application layer using an interface provided by the TCP/IP is located as the upper most layer.

A router located in an access network to which an end host is connected and a backbone network connected to the access network, each include only a PHY/MAC layer and an IP layer located above the PHY/MAC layer and concerned with packet transfer. That is, a router, which is a network node, is not involved in error and traffic control with respect to packets and main control functions for communication exist only in end hosts.

In this structure, since only the end hosts have most main functions for communication, a new type of application can be introduced, just with implementation at the end hosts. As a result, the limitation of an existing telecom service, requiring the update of network functions, could be overcome, making it possible to realize the explosive growth of the Internet as now.

However, since the above structure is basically based on a simple network structure of its initial development stage, the following problems may be caused in a current or future network environment, which is different from the past environment.

First, since communication is carried out based on end hosts, the problem of scalability such as the explosive expansion of a routing table may be caused in the current or future environment where a huge number of hosts are present.

Secondly, as can be seen in the current tendency, since access networks providing access to the Internet are being continuously diversified, it may be inefficient to support such diverse access networks with a single protocol between end hosts. For example, it is expected that a variety of multiple access networks will be configured into wireless networks, rather than related art wired networks. In this case, a wired network-based TCP is insufficient to cope with such an environment.

Thirdly, an access network that is to be implemented wirelessly by various techniques, and a backbone network that is to be implemented based on an optic network with large capacity, may have different characteristics. In such a heterogeneous environment, it may be inefficient to use the structure where only end hosts are concerned with error and traffic control while a network is concerned with only packet transfer regardless of the kinds of backbone and access as in the current Internet.

Fourthly, a communication structure between end hosts in the current Internet cannot directly respond to the occurrence of problems in a network. The general principle is that a problem needs to be addressed by the nearest point. However, the communication structure between end hosts in the current Internet has limitations in that error detection and control in a network, which is the leading cause of actual error and traffic congestion, are inevitably performed in an indirect manner because only the end hosts have the functions for error and traffic control.

In order to improve the end-to-end communication structure of the current internet having the above problems, research is being conducted by studying the future Internet. However, this research is still in its conceptual stage, and an explicit method to solve the above problems has not been proposed.

SUMMARY OF THE INVENTION

The present invention has been made in an effort to provide a communication method and a communication node having advantages of providing data transfer flexible to diverse access network environments and more efficient for error and traffic control in communication between end nodes.

An exemplary embodiment of the present invention provides a communication method for communication through end nodes connected to a backbone network through access networks.

The communication method includes: receiving, by a transmission end node connected to the backbone network, a packet including identifier information regarding a reception end host from an access network to which a transmission end host is connected; adding, by the transmission end node, a transport control protocol (TCP) header for error control and traffic control in the backbone network to the received packet; and routing, by the transmission end node, the packet including the TCP header to a reception end node through the backbone network.

The communication method may further include: receiving, by the reception end node, the packet through the backbone network; removing the TCP header from the packet; and transferring the packet from which the TCP header has been removed to an access network to which the reception end host is connected, and providing the packet to the reception end host.

Another embodiment of the present invention provides a communication method for communication between end hosts through end nodes connected to a backbone network through access networks, including: generating, by an end host to transmit data, an application packet; generating an Internet protocol (IP) packet by adding to the application packet an IP header including host identifier information corresponding to a reception path and a destination path; generating a frame by adding to the IP packet a network frame header regarding an access network to which the end host is connected; and transmitting the frame to the access network.

The communication method may further includes: receiving, by the end host, the frame from the access network, the frame including a network frame header, an IP header including host identifier information, an application header including an application identifier, and data; acquiring an IP packet by removing the network frame header from the received frame; and finally acquiring the data by removing the application header from the IP packet.

Yet another embodiment of the present invention provides a communication node connected to a backbone network and performing communication between end hosts through an access network, including: a network interface layer receiving a packet from one access network, the packet including a network frame header, an Internet protocol (IP) header including host identifier information, an application header including an application identifier, and data; an IP layer acquiring an IP packet by removing the network frame header from the packet; and a transport control protocol (TCP) layer adding to the IP packet a TCP header for error control and traffic control in the backbone network, and transferring the packet including the TCP header to the backbone network.

The end host may include: an application layer generating an application packet including an application identifier in data to be sent; an IP layer generating an IP packet by adding to the application packet an IP header including host identifier information corresponding to a reception path and a destination path; and a network interface layer generating a frame by adding to the IP packet a network frame header regarding an access network to which the end host is connected, and transmitting the frame to the access network.

DETAILED DESCRIPTION OF THE EMBODIMENTS

Figure 1:
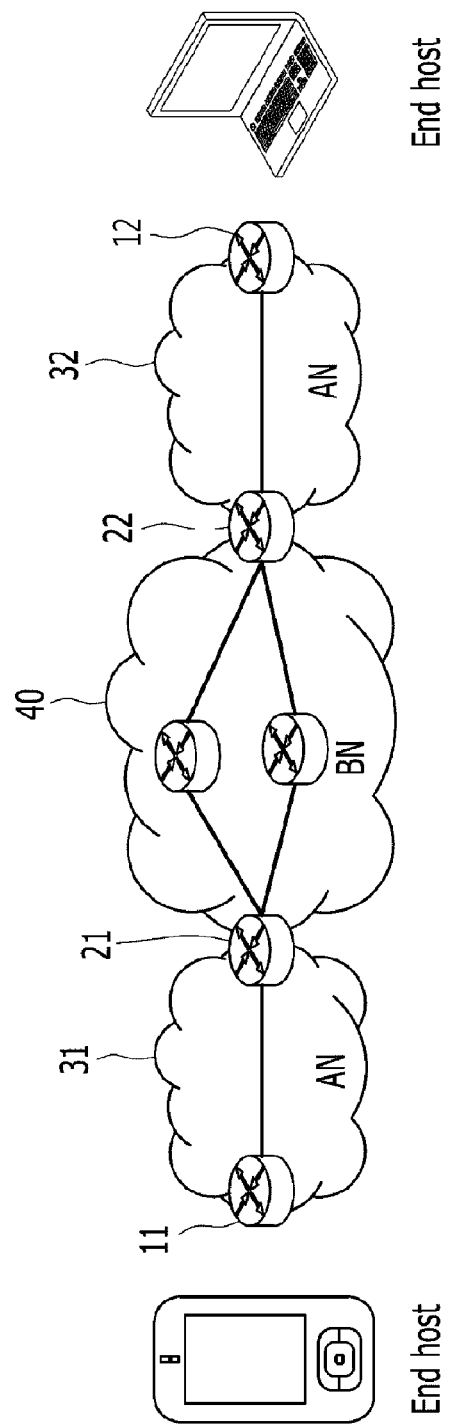
FIG. 1 is a diagram illustrating a network environment for communication according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, In addition, unless explicitly described to the contrary, the word "comprise" and variations such as "comprises" or "comprising", will be understood to imply the inclusion of stated elements but not the exclusion of any other elements.

In this specification, an end host may refer to a terminal, a mobile station (MS), a mobile terminal (MT), a subscriber station (SS), a portable subscriber station (PSS), user equipment (UE), an access terminal (AT), or the like, and may include the functions of a portion or the entirety of a mobile terminal, a subscriber station, a portable subscriber station, user equipment, and the like.

In this specification, an end node may refer to an access point (AP), a base station (BS), a wireless access station (RAS), Node B), a base transceiver station (BTS), a mobile multihop relay (MMR)-BS, or the like, and may include the functions of a portion or the entirety of an access point, a wireless access station, a node B, a base transceiver station, a mobile multihop relay (MMR)-BS, and the like.

Hereinafter, a communication node and a communication method according to an exemplary embodiment of the present invention will be described.

FIG. 1 is a diagram illustrating a network environment for communication according to an exemplary embodiment of the present invention.

As shown in FIG. 1, a plurality of end hosts 11 and 12 communicate with each other through a plurality of end nodes 21 and 22. Namely, one end host 11 communicates with another end host 12 through the end nodes 21 and 22 positioned between an access network 31 and a backbone network 40, and the end node 21 communicates with the end node 22 positioned between the backbone network 40 and another access network 32. In such a manner, a packet from the end host 11 is delivered to another end host 12. Here, the end nodes 21 and 22 function as routers.

In this network environment, network functions for communication between end nodes according to an exemplary embodiment of the present invention are distributed as follows.

Figure 2:
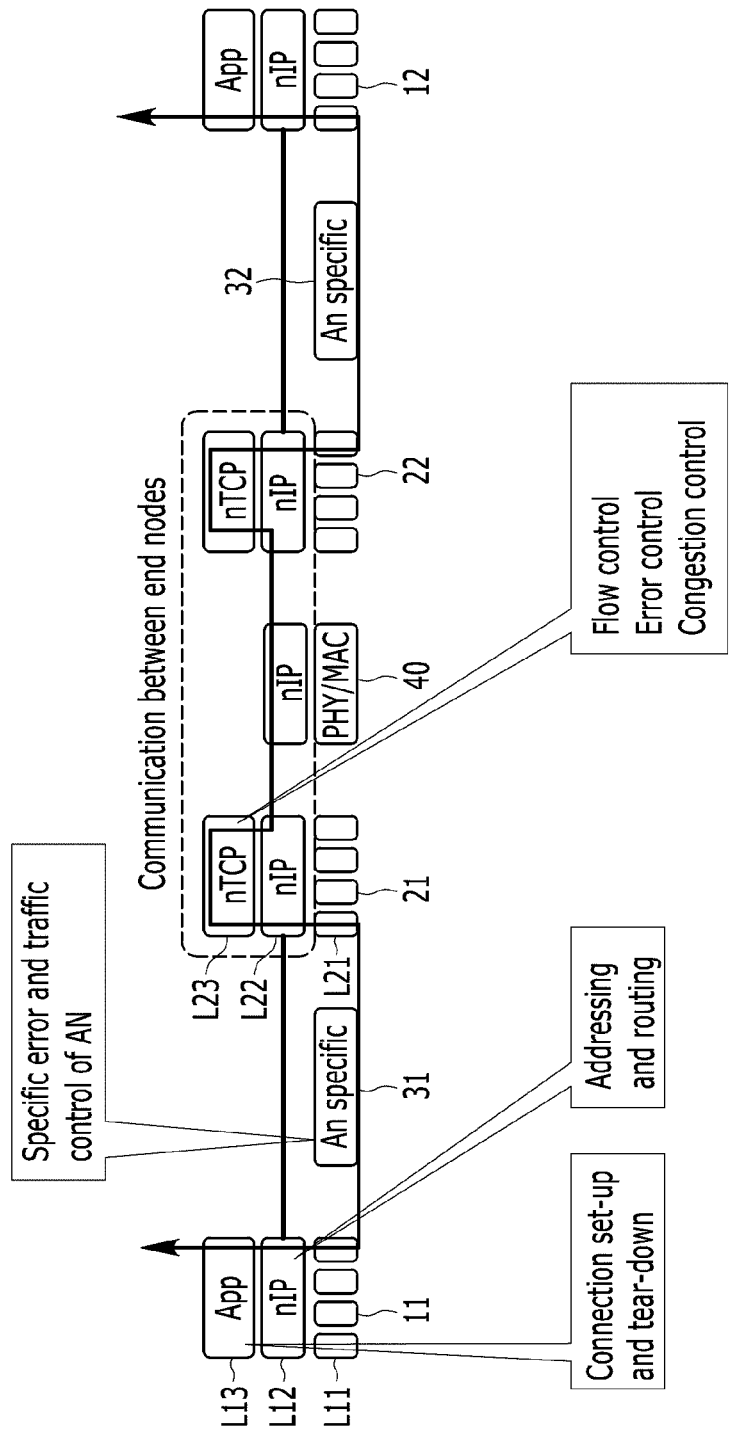
FIG. 2 is a diagram illustrating the distribution of network functions in a network environment according to an exemplary embodiment of the present invention.

FIG. 2 is a diagram illustrating the distribution of network functions according to a network environment according to an exemplary embodiment of the present invention.

According to an exemplary embodiment of the present invention, an IP layer is concerned with addressing and routing functions for inter-networking over the entire network, and the IP layer provides an open interface for application. According to an exemplary embodiment of the present invention, this IP layer is called a new Internet protocol (nIP).

Error and traffic control functions in access networks depend on the characteristic functions provided by each of the access networks, and an end node located at the end of the backbone network is concerned with flow control, error control, and congestion control within the backbone network by using a new TCP (nTCP).

As shown in FIG. 2, the end hosts 11 and 12, according to an exemplary embodiment of the present invention, each include a physical/media access control (PHY/MAC) layer L11 unique to each access network, an nIP layer L12, which is an IP layer for addressing and routing support for packet transfer and located over the PHY/MAC layer which is a physical layer, and an application layer L13 located over the nIP layer and using an interface provided by the nIP layer. Here, the nIP layer L12 according to an exemplary embodiment of the present invention performs addressing and routing functions for inter-networking over the entire network, and also performs the function of providing an open interface for an application.

An application, implemented at the application layer L13, identifies a corresponding application based on an identifier provided from the nIP layer L12, and a port identifier as in the current Internet may be additionally used in order to support multiple applications. For this purpose, standardized identifiers and ports are provided in the nIP layer L12, which is a new internet protocol according to an exemplary embodiment of the present invention. Furthermore, the application layer L13 performs connectivity control for connection set-up and tear-down between applications.

Meanwhile, the error and traffic control function of each access network depends on the function provided by each access network itself. That is, if an access network is a general packet radio service (GPRS), an error and traffic control function provided from the GPRS is used, and if it is Ethernet, an error and traffic control function provided from the Ethernet is used.

The end nodes 21 and 22, located between the access network and the backbone network, each include a PHY/MAC layer L21, an nIP layer L22, and particularly, a new transport control protocol (TCP) (nTCP) layer L23, which is a TCP layer performing flow control, error control and congestion control in the backbone network 40 according to an exemplary embodiment of the present invention. Hereinafter, for better comprehension and ease of description, the PHY/MAC layer of each host and node is referred to as a network interface layer.

The end nodes 21 and 22 receive an nIP packet from an end host and deliver it to a receiver. In this case, for the error and traffic control in the backbone network 40, the transmission/reception is carried out by using the nTCP, a new transport protocol between end nodes. Therefore, the nTCP layers L23 of the end nodes 21 and 22 perform flow control, error control, and congestion control in the backbone network 40, rather than the access networks 31 and 32.

Packet transmission/reception is carried out through the end hosts 11 and 12 and the end nodes 21 and 22 having the protocol structure as described above, and the packet transfer and error/traffic control between the end hosts 11 and 12 and the backbone network 40 is carried out depending on the technique of each of the access networks 31 and 32. That is, nIP packets generated at the end hosts 11 and 12 are considered as payloads of two-layer frames used for data transfer within each access network, and nIP packet header information is not processed.

The end node 21 transmits an nIP packet sent from the end host 11 to the end node 22 of a reception side, and packet transfer within the backbone network 40 is performed by nIP-based routing. The end node 22 of the reception side receives an nIP packet transmitted from the end node 21 of the transmission side through the backbone network 40, and transmits the nIP packet from which an nTCP-related header has been removed by using the access network of the reception side. In such a manner, communication between applications of the end hosts is made.

Hereinafter, a communication method according to an exemplary embodiment of the present invention will be described on the basis of the above protocol structure.

First, packet transmission/reception between an end host of a transmission side, namely, the transmission end host 11, and an end node of a transmission side, namely, the transmission end node 21 is located between an access network 31 accessed by the transmission end host 11 and a backbone network 40, as shown in FIG. 1 and FIG. 2, will be described.

Figure 3:
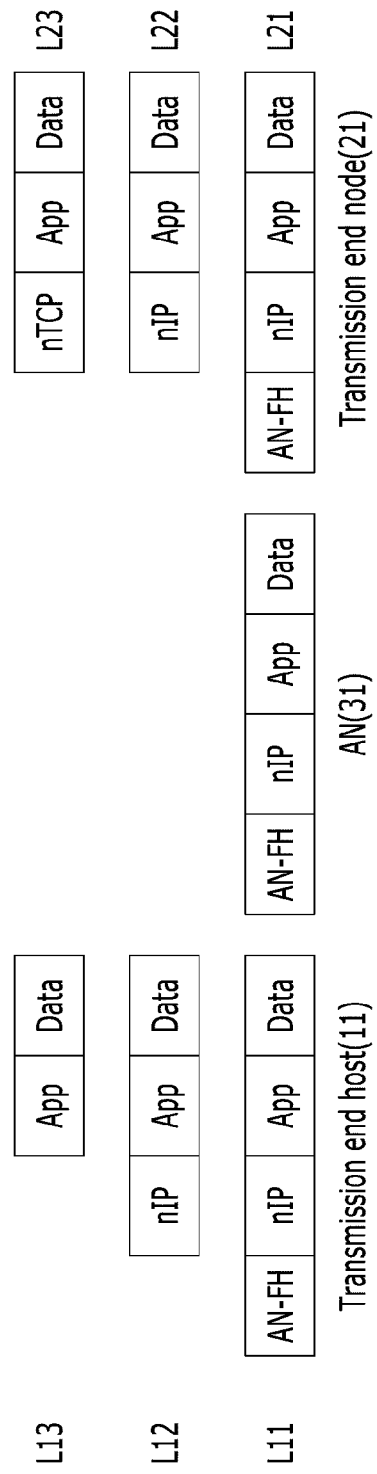
FIG. 3 is an exemplary diagram illustrating a structure of a packet being transmitted/received between a transmission end host and a transmission end node.
Figure 4:
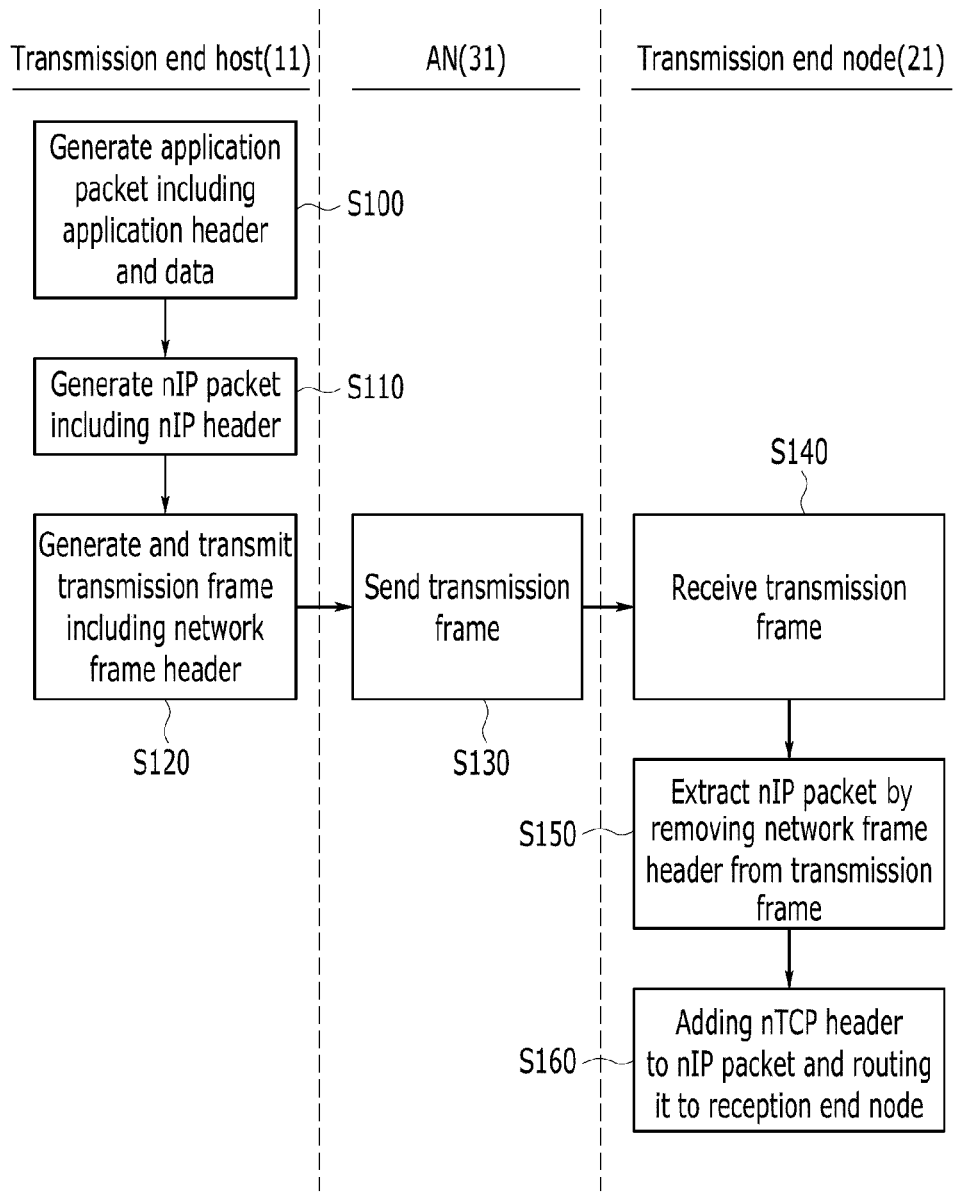
FIG. 4 is a flowchart illustrating a communication method between a transmission end host and a transmission end node according to an exemplary embodiment of the present invention.

FIG. 3 is an exemplary diagram illustrating the structure of a packet being transmitted/received between a transmission end host and a transmission end node, and FIG. 4 is a flowchart illustrating a communication method between the transmission end host and the transmission end node according to an exemplary embodiment of the present invention.

Referring to FIGS. 3 and 4, the transmission end host 11 generates a packet regarding data to be transmitted. As shown in FIG. 3, in the transmission end host 11, the application layer L13 generates an application packet regarding the data to be sent, based on application-related information (an identifier, a port number, and the like) provided from the nIP layer L12. The generated application packet includes an identifier between applications (a portion number and an identifier of a corresponding application), and connection control information, and these are included in an application header (App). The application packet including the application header App and the data is transmitted to the nIP layer L12 in operation S100.

The nIP layer L12 adds an nIP header nIP for inter-networking to the application packet. The nIP header nIP includes host identifier information corresponding to source and destination paths for inter-networking, and the host identifier information includes a transmission end host identifier and a reception end host identifier. The application packet to which the nIP header nIP has been added, that is, an nIP packet, is generated and transmitted to the network interface layer L11 in operation S110.

Through the network interface layer L11 of the transmission end host 11, an access network frame header (AN-FH) is attached to the application packet including the nIP header nIP, the application header App and the data so that the application packet is processed into a transmission frame. The transmission frame, generated in the transmission end host 11 in the above manner, is transmitted to the access network 31 in operation S120, and is delivered to the transmission end node 21 through the transmission function of the access network 31 in operation S130.

When the transmission frame is delivered to the transmission end node, located at the end of the backbone network 40, through the access network 31 in operation S140, the network interface layer L21 of the transmission end node 21 removes the network frame header (AN-FH) from the received transmission frame, and delivers the packet without the access network frame header, that is, an nIP packet, to the nIP layer L22 in operation S150. The nIP layer L22 delivers this to the nTCP layer L23. The nTCP layer L23 adds an nTCP header nTCP, including information for TCP connection line control and data management, to the nIP packet in operation S160. As an end node directly performs the TCP connection line control and data management, the end node may directly perform problem detection and control in a network which is the leading cause of actual error and traffic congestion. That is, according to an exemplary embodiment of the present invention, the end node directly detects and copes with errors and congestion, unlike the existing internet where an end host indirectly detect error and congestion generated in a backbone network. Accordingly, more efficient error and traffic control can be carried out. Furthermore, since the error and traffic control function of each access network is used in the access network, more efficient control can be achieved with respect to diverse access networks.

Figure 5:
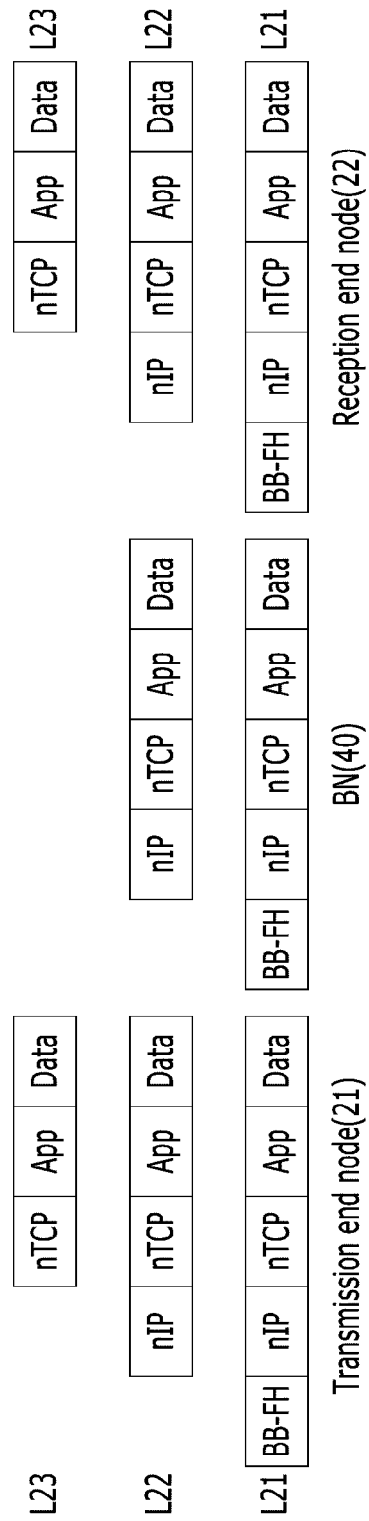
FIG. 5 is an exemplary diagram illustrating a structure of a packet being transmitted/received between a transmission end node and a reception end node.

FIG. 5 is an exemplary diagram illustrating the structure of a packet being transmitted/received between a transmission end node and a reception end node.

Meanwhile, the nIP packet including the nTCP header nTCP is routed to the reception end node 22 through the backbone network 40 from the transmission end node 21. As shown in FIG. 5, intermediate nodes for routing within the backbone network 40 deliver the corresponding packet to the reception end node 22, based on host identifier information of the nIP layer included in the packet. At the time of routing, the end nodes within the backbone network 40 deliver the packet through routing based on the host identifier information, without using information of the nTCP layer included in the packet.

Hereinafter, packet transmission/reception between the reception end node 22 and the reception end host 12 will be described.

Figure 6:
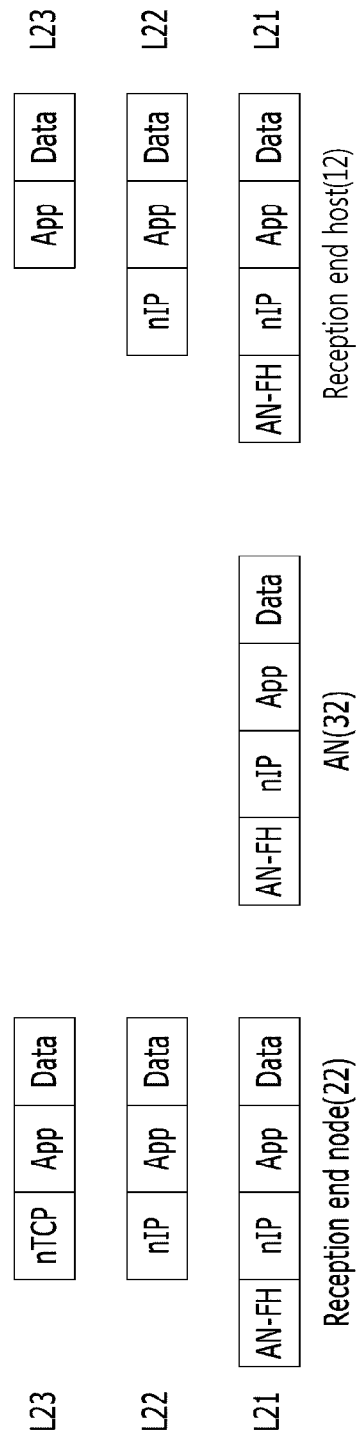
FIG. 6 is an exemplary diagram illustrating a structure of a packet being transmitted/received between a reception end node and a reception end host.
Figure 7:
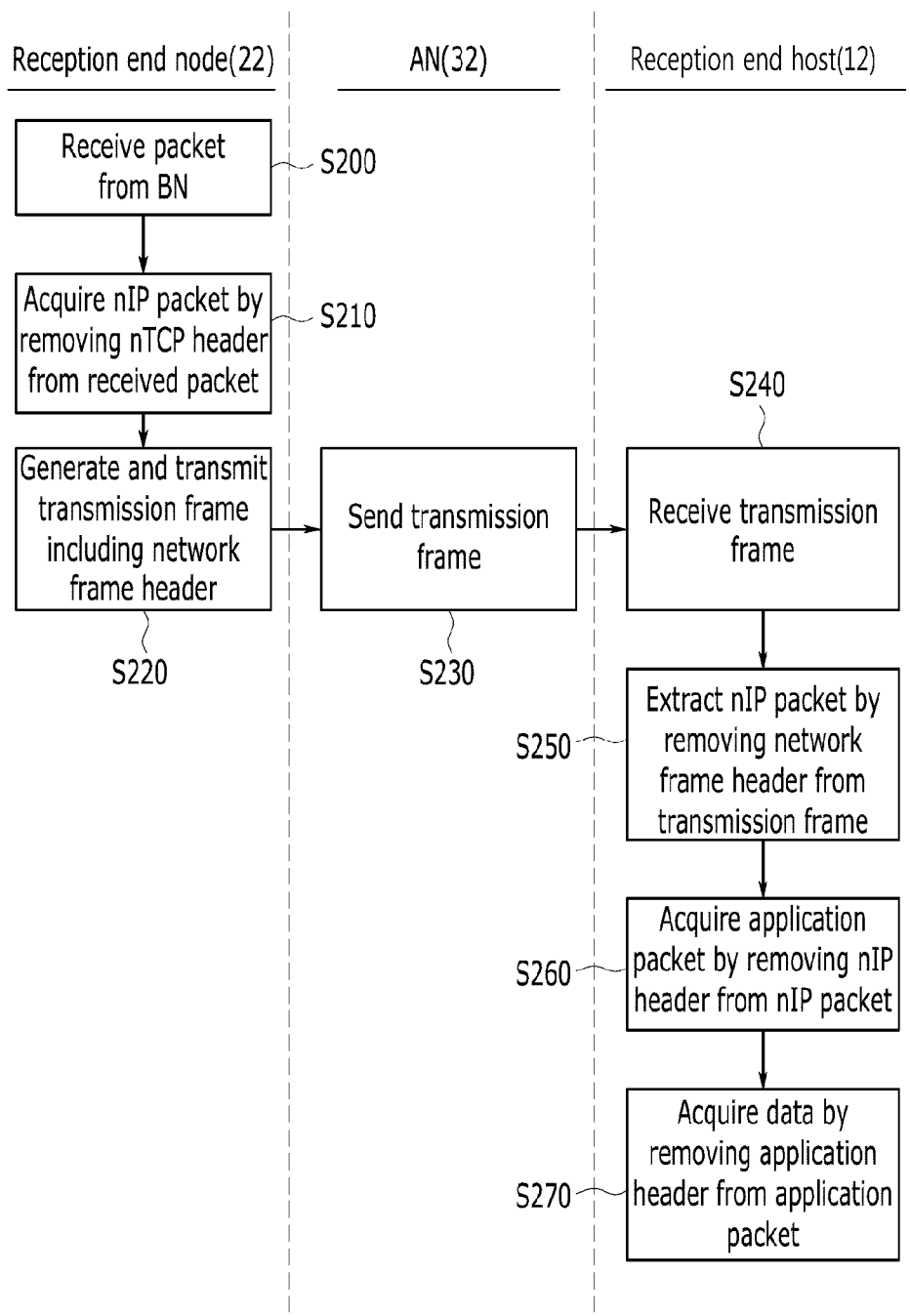
FIG. 7 is a flowchart illustrating a communication method between a reception end node and a reception end host according to an exemplary embodiment of the present invention.

FIG. 6 is an exemplary diagram illustrating the structure of a packet being transmitted/received between the reception end node and the reception end host. FIG. 7 is a flowchart illustrating a communication method between the reception end node and the reception end host according to an exemplary embodiment of the present invention.

On the contrary to the access network of the transmission side, the reception end node 22 delivers a packet to the reception end host 12 through the procedure of sending the nIP packet from which the nTCP header for transmission in the backbone network has been removed. Specifically, as shown in FIG. 6 and FIG. 7, the nTCP layer L23 of the reception end node 22 removes the nTCP header nTCP from the packet having received through the backbone network 40, and transfers it to the nIP layer L22 in operations S200 and S210, and the nIP layer L22 transfers a packet from which the nTCP header has been removed, namely, an nIP packet, to the network interface layer L21. The network interface layer L21 processes the received nIP packet into a frame by adding thereto an access network frame header (AN), specifying an access network connected to the reception end host 12, and sends the frame to the access network to which the reception end host 12 is connected in operation S220.

The access network 32 receives the frame from the reception end node 22, and sends it to the reception end host 12 in operation S230.

The reception end host 12 acquires the nIP packet by removing the access network frame header AN from the frame received from the access network 32 in operations S240 and S250, and the nIP layer L12 of the reception end host 12 removes the nIP header nIP from the acquired nIP packet and delivers it to the application layer L13 in operation S260. The application layer L13 finally acquires the data by removing the application header App from the application packet in operation S270.

Through the above operations, a packet generated from the transmission end host 11 is delivered to the reception end host 12 through the transmission end node 21, and the reception end node 22.

The communication method according to the exemplary embodiment of the present invention may be applied to the following network environment.

Figure 8:
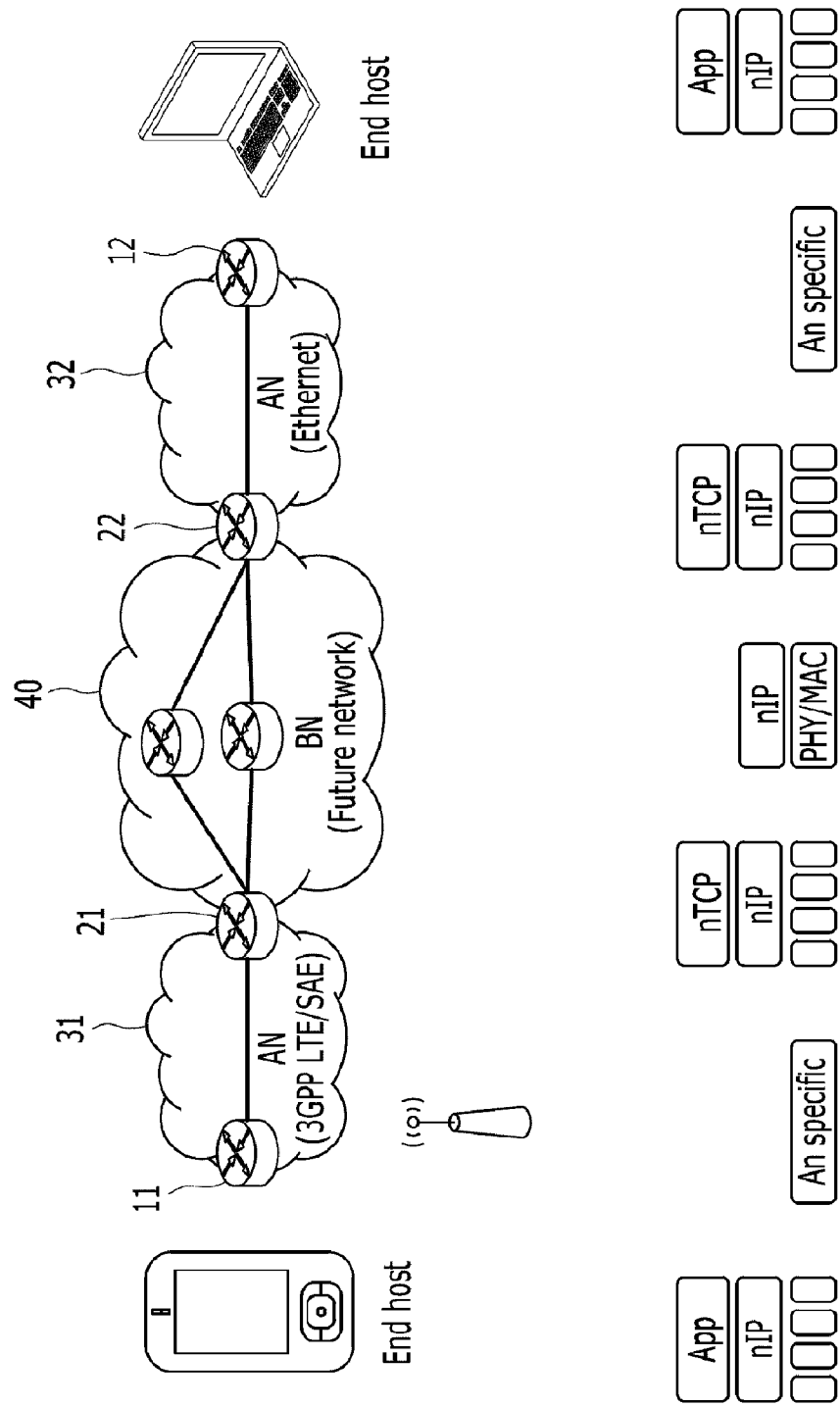
FIG. 8 is an exemplary diagram illustrating another network environment to which the communication method according to an exemplary embodiment of the present invention is applied.

FIG. 8 is an exemplary diagram illustrating another network environment to which the communication method according to the exemplary embodiment of the present invention is applied.

As shown in FIG. 8, even in a network environment in which the end hosts 11 and 12 are respectively connected to a 3GPP LTE/SAE-based access network 31 and an Ethernet-based access network 32, packets can be transmitted/received between the end hosts by the aforementioned communication method. For example, the access network 31 connected to the end host 11 is 3GPP LTE/SAE-based network supporting the connection between an end host and the future Internet 40, and the access network 32 connected to the end host 12 is the Ethernet.

In the case of the 3GPP-based access network 31, the connection between the end host 11 and the end node 21 is made by a 3GPP-based technique, namely, a GPRS tunneling protocol (GTP) or generic routing encapsulation (GRE)/proxy mobile IP (PMIP). In this case, the error and traffic control function in the access network is carried out in the end node 21, and the error and traffic control procedure is supported by a 3GPP algorithm. This procedure is a known technique, and thus a detailed description thereof is omitted herein.

Meanwhile, in the case of the end host 12 connected to the Ethernet 32, a connection between the end host 12 and the end node 22 is made based on the Ethernet protocol, and the error and traffic control function in the access network is processed according to the Ethernet protocol.

In the above exemplary embodiment of the present invention, if an existing IP protocol is already in use in the access network, the IP protocol itself is considered as part of the access network transfer technique, and the nIP is implemented at the upper layer of the IP protocol.

In the present or future network environment consisting of a plurality of end hosts, exemplary embodiments of the present invention can provide data transfer flexible to diverse access network environments and more efficient for error and traffic control while maintaining the ease of introduction of new applications as in the current Internet.

The following effects can be provided according to the exemplary embodiments of the present invention.

First, different protocol stacks, rather than a single protocol, is applied between an access network and a backbone network having different network characteristics, thus enhancing the overall network communication efficiency.

Secondly, unlike the existing Internet technique where errors and traffic control are detected and handled in an indirect manner, according to an exemplary embodiment of the present invention, the end node connected to the backbone network can directly perform error detection and control in a network which is the leading cause of actual error and traffic congestion, thus enhancing the efficiency of control.

Thirdly, since inter-networking is carried out by implementing only the functions of a network layer at an end host, the introduction of a new application of the existing Internet is facilitated, and an end host with a simpler structure can be implemented.

Fourthly, by using the error and traffic control functions of the access network itself in diverse access network environments, the redundancy of TCP functions and the functions of the access network itself in the existing Internet is eliminated, thus enabling more efficient error and traffic control.

Fifthly, the scalability of the inter-networking can be improved by using the functions of the access network itself without performing additional routing in the access network.

Exemplary embodiments of the present invention are not limited to the device and/or method described above and may be implemented by a program for executing the functions corresponding to the configuration of the exemplary embodiment of the present invention, a recording medium on which the program is recorded, or the like. Such implementation can be easily achieved by those skilled in the art from the above disclosure of the exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication method for wireless communication between end hosts through end nodes wirelessly connected to a backbone network through an access network, comprising:
    receiving, by a transmission end node connected to the backbone network, a transmission frame including a network frame header regarding the access network to which a transmission end host is connected and an Internet protocol (IP) packet including identifier information regarding a reception end host from the access network, wherein the IP packet does not include a transport control protocol (TCP) header for error control and traffic control in the backbone network, when the transmission frame is received to the transmission end node;
    removing, by the transmission end node, the network frame header from the transmission frame;
    adding, by the transmission end node, the TCP header to the packet; and
    routing, by the transmission end node, the IP packet including the TCP header to a reception end node through the backbone network.

2. The communication method of claim 1, further comprising:
    receiving, by the reception end node, the IP packet through the backbone network;
    removing the TCP header from the IP packet; and
    transferring the IP packet from which the TCP header has been removed to an access network to which the reception end host is connected so that the IP packet is provided to the reception end host.

3. The communication method of claim 1, further comprising receiving, by the access network, the transmission frame transmitted from the transmission end host and transferring the transmission frame to the transmission end node,
    wherein the access network performs traffic control and error control between the end host and the end node according to a corresponding protocol.

4. The communication method of claim 1, further comprising transferring, by the backbone network, the IP packet to the reception end node based on the identifier information of an IP header regardless of information of a TCP layer.

5. A communication node wirelessly connected to a backbone network and performing wireless communication between end hosts through an access network, comprising:
    a processor for executing:
    a network interface layer receiving a transmission frame from one access network, the transmission frame including a network frame header regarding the access network to which a transmission end host is connected and an Internet protocol (IP) packet including identifier information regarding a reception end host,
        wherein the IP packet does not include a transport control protocol (TCP) header for error control and traffic control in the backbone network when the transmission frame is received to the communication node;
    an IP layer acquiring the IP packet by removing the network frame header from the transmission frame; and
    a transport control protocol (TCP) layer adding to the IP packet the TCP header and transferring the IP packet including the TCP header to the backbone network.

6. The communication node of claim 5, wherein, when the IP packet is provided from the backbone network, the IP packet including the TCP header is received through the TCP layer, the TCP header is removed from the IP packet through the IP layer, the network frame header regarding an access network to which an end host to which the IP packet is transmitted is connected is added to the IP packet and transmitted to the access network through the network interface layer.

7. The communication node of claim 5, wherein the access network performs error control and traffic control between the end host and the communication node according to a corresponding protocol.

* * * * *